United States Patent
Yoshihara

(10) Patent No.: US 7,159,556 B2
(45) Date of Patent: Jan. 9, 2007

(54) CONTROL APPARATUS AND METHOD FOR INTERNAL COMBUSTION ENGINE

(75) Inventor: Masatomo Yoshihara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/219,666

(22) Filed: Sep. 7, 2005

(65) Prior Publication Data

US 2006/0048737 A1 Mar. 9, 2006

(30) Foreign Application Priority Data

Sep. 9, 2004 (JP) ............... 2004-262755

(51) Int. Cl.
*F02D 41/06* (2006.01)
*F01L 13/00* (2006.01)

(52) U.S. Cl. ................................. 123/179.18

(58) Field of Classification Search .................. None
See application file for complete search history.

(56) References Cited

U.S. PATENT DOCUMENTS

2002/0166524 A1* 11/2002 Nakamura et al. ....... 123/90.15

FOREIGN PATENT DOCUMENTS

| JP | A-2002161768 | 8/2002 |
| JP | A-2002-276446 | 9/2002 |
| JP | A-2003-003872 | 1/2003 |
| JP | 2004-36425 A * | 2/2004 |

OTHER PUBLICATIONS

German language version of "The Management of the New BMW Valvetronic Engines" —MTZ 62(2001) 7/8: and English translation of "The Management of the New BMW Valvetronic Engines" — MTZ 62(2001) 7/8.
German language version of "The New BMW 8-Cylinder Engine with Valvetronic" —MTZ 62(2001) 10: and English translation MTZ 62(2001) 10.

* cited by examiner

*Primary Examiner*—Andrew M. Dolinar
(74) *Attorney, Agent, or Firm*—Kenyon & Kenyon LLP

(57) ABSTRACT

A working angle (lift amount) of an intake valve is set to a predetermined first set value A1 during a period from when starting of the engine is initiated until when the engine is shifted to an initial combustion state, and the working angle is changed to a second set value A2 (=previous value (initial value is A1)+α) that is larger than the first set value A1 during a period from when the engine is shifted to the initial combustion state until when the engine is shifted to a perfect combustion state. When an engine rotational speed becomes equal to or higher than a reference rotational speed n1, it is determined that the engine has been shifted to the perfect combustion state, after which an engine starting routine ends.

12 Claims, 4 Drawing Sheets

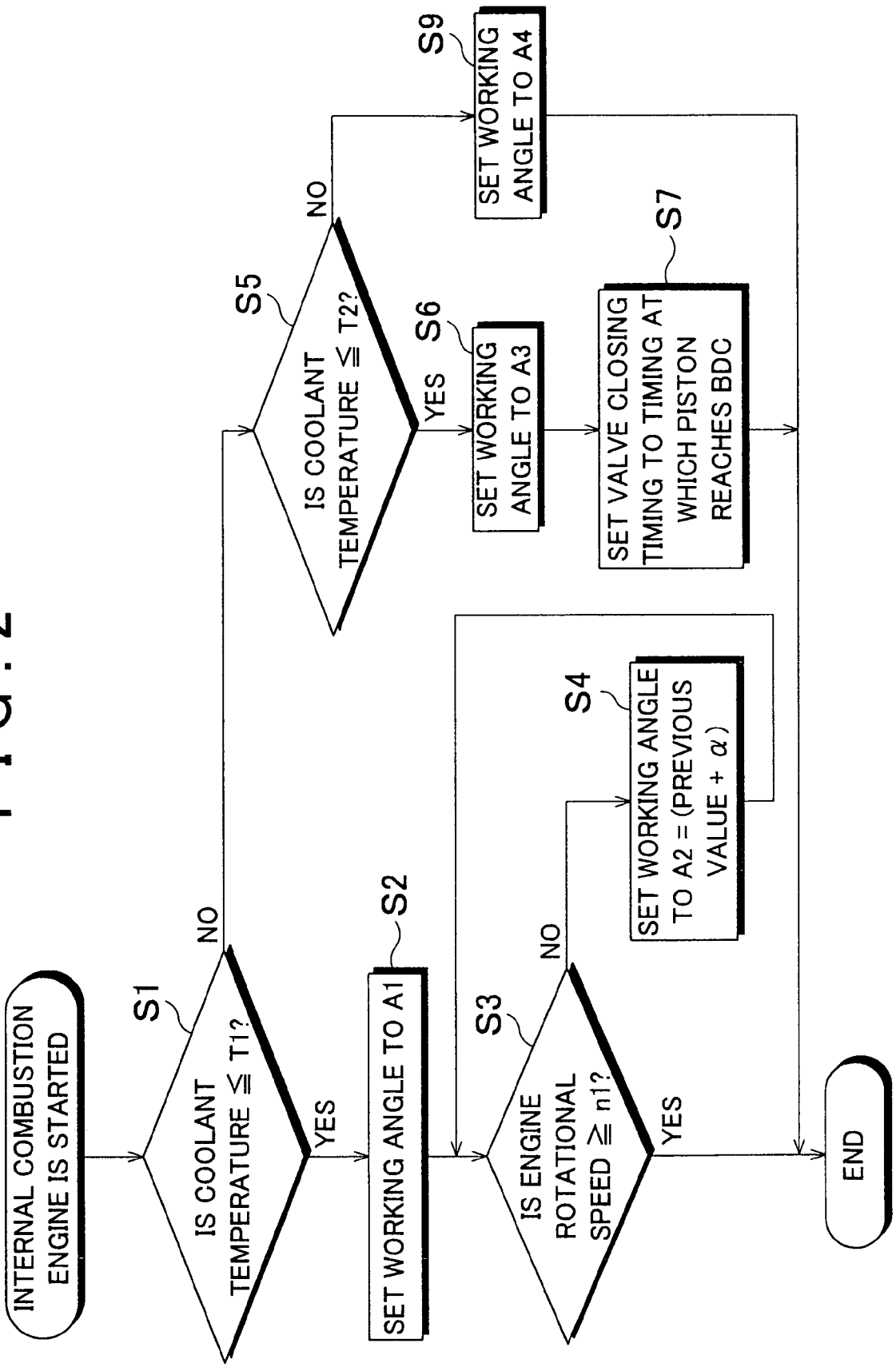

CONTROL APPARATUS AND METHOD FOR INTERNAL COMBUSTION ENGINE

INCORPORATION BY REFERENCE

The disclosure of Japanese Patent Application No. 2004-262755 filed on Sep. 9, 2004 including the specification, drawings and abstract is incorporated herein by reference in its entirety.

BACKGROUND OF THE INVENTION

1. Field of the Invention

The invention relates to a control apparatus and method for an internal combustion engine including a variable valve mechanism which can change at least a lift amount of an intake valve as an opening/closing characteristic of the intake valve.

2. Description of the Related Art

In an internal combustion engine, an intake air amount required when the internal combustion engine is started (a required air amount) varies depending on an engine operating state such as a temperature of the engine. Conventionally, such a required air amount is adjusted by controlling an opening amount of a throttle valve. However, in recent years, various methods for adjusting the required air amount have been proposed, such as a method in which the required air amount is adjusted by changing a lift amount of an intake valve or a valve opened period (a working angle) of the intake valve.

Japanese Patent Application Publication No. 2002-276446 A discloses an apparatus for adjusting an intake air amount when an engine is started. This apparatus includes a lift amount/working angle changing mechanism which can increase/decrease a lift amount and a working angle of an intake valve simultaneously and continuously. The apparatus performs control such that the lift amount and the working angle of the intake valve are made small when the engine is started while the engine is cold.

With this apparatus, since the lift amount and the working angle of the intake valve are controlled to be small when the internal combustion engine is started while the engine is cold, air is take in a combustion chamber at a high speed. Accordingly, atomization of injected fuel is promoted, and a good air-fuel mixture is formed.

With such an apparatus, a good air-fuel mixture is formed by setting both the lift amount and the working angle of the intake valve to small values when the engine is started, especially, when the engine is started while the engine is cold. Accordingly, the air-fuel mixture can be ignited promptly and reliably.

With this apparatus, however, the following problem may occur concerning further improvement of startability. With the apparatus, it is possible to reduce a period until the air-fuel mixture is initially ignited, namely, a period until the internal combustion engine is shifted to an initial combustion state. However, in the state where the lift amount and the working angle are controlled to be small, a sufficient amount of intake air may not be obtained in a period until the internal combustion engine is shifted to a perfect combustion state, namely, a period until the internal combustion engine is shifted to a state where the internal combustion engine can operate by itself. Accordingly, the period from when the internal combustion engine is shifted to the initial combustion state until when the internal combustion engine is shifted to the perfect combustion state may be long due to an insufficient output from the engine.

SUMMARY OF THE INVENTION

It is an object of the invention to provide a control apparatus and method for an internal combustion engine, which can improve startability when the internal combustion engine is started, more specifically, when the internal combustion engine is started while the internal combustion engine is cold.

According to a first aspect of the invention, there is provided a control apparatus for an internal combustion engine, including a variable valve mechanism which can change at least a lift amount of an intake valve as an opening/closing characteristic of the intake valve; and a controller which sets the lift amount to a predetermined first set value by using the variable valve mechanism when starting of the internal combustion engine is initiated, and then changes the lift amount to a second set value that is larger than the first set value before the internal combustion engine is shifted to a perfect combustion state.

According to the first aspect, since the lift amount of the intake valve is set to the first set value that is a relatively small value when starting of the internal combustion engine is initiated, air is taken in a combustion chamber at a high speed, and, therefore, turbulence of an air-fuel mixture occurs in the combustion chamber. Accordingly, atomization of the fuel is promoted, and the internal combustion engine can be shifted to an initial combustion state more promptly. After this, the lift amount of the intake valve is set to the second set value that is larger than the first set value, and, therefore, a larger amount of air is supplied to the combustion chamber. Accordingly, an output from the engine is increased, and the internal combustion engine is shifted to the perfect combustion state in a shorter time. Also, the perfect combustion state can be maintained stably. According to the first aspect, it is, therefore, possible to shift the internal combustion engine to the perfect combustion state in a short time after starting of the internal combustion engine is initiated, and to maintain the perfect combustion state stably. As a result, it is possible to improve startability of the internal combustion engine.

In the first aspect, there may be further provided a determining device which determines a combustion state of the internal combustion engine. Before the lift amount of the intake valve is changed, the controller may maintain the lift amount at the first set value until the determining device determines that the internal combustion engine has been shifted to an initial combustion state after starting of the internal combustion engine is initiated.

With this structure, the lift amount of the intake valve is maintained at the first set value that is smaller than the second set value when it is determined that the internal combustion engine has not been shifted to the initial combustion state. It is, therefore, possible to minimize a possibility that shifting of the internal combustion engine to the initial combustion state is delayed by changing the lift amount of the intake valve to the second set value before the internal combustion engine is shifted to the initial combustion state.

Also, the determining device may monitor an engine rotational speed as a factor related to the combustion state of the internal combustion engine. Before the lift amount of the intake valve is changed, the controller may maintain the lift amount at the first set value until the determining device determines that the engine rotational speed of the internal combustion engine has reached an engine rotational speed corresponding to the initial combustion state after starting of the internal combustion engine is initiated.

As mentioned above, the determining device which determines the combustion state of the internal combustion engine may monitor the engine rotational speed that is highly related to the combustion state of the internal combustion engine. Namely, it is assumed that, as the engine rotational speed increases, the combustion state of the internal combustion engine becomes more stable, and the combustion state is closer to the perfect combustion state. Accordingly, when the above-mentioned structure is employed, the lift amount may be maintained at the first set value if it is determined that the engine rotational speed has not reached the engine rotational speed corresponding to the initial ignition state.

In the first aspect, there may be further provided an engine temperature detector which detects a temperature of the internal combustion engine when starting of the internal combustion engine is initiated. When the temperature of the internal combustion engine is equal to or lower than a first predetermined temperature, the controller may change the lift amount to the second set value that is larger than the first set value before the internal combustion engine is shifted to the perfect combustion state.

When the temperature of the internal combustion engine is considerably low, the above-mentioned lift amount changing process for the intake valve is extremely effective. However, when the internal combustion engine is started while the temperature thereof is a normal value, or when the internal combustion engine is started while the temperature thereof is high, for example, when the internal combustion engine is restarted after being started and operated once, such a lift amount changing process is not very effective. Instead of performing the above-mentioned lift amount changing process, increasing the lift amount of the intake valve in advance based on the amount of intake air required to start the internal combustion engine may be effective in improving startability.

The controller changes the lift amount to the second set value that is larger than the first set value before the internal combustion engine is shifted to the perfect combustion state, when the temperature of the internal combustion engine is equal to or lower than the first predetermined temperature. Thus, such a changing process can be performed when the necessity to perform this changing process is great.

Also, when the temperature of the internal combustion engine is equal to or lower than a second predetermined temperature that is higher than the first predetermined temperature, the controller may set the lift amount to a third set value that is larger than the first set value during a period from when starting of the internal combustion engine is initiated until when the internal combustion engine is shifted to the perfect combustion state.

When the temperature of the internal combustion engine is a normal value, the fuel is atomized appropriately, as compared to the case where the temperature of the internal combustion engine is considerably low. Accordingly, if the lift amount of the intake valve is excessively small, the intake air amount is decreased, raising a possibility that fuel and air are not sufficiently mixed with each other. Therefore, when the temperature of the internal combustion engine is equal to or lower than the second predetermined temperature that is higher than the first predetermined temperature, that is, when the temperature of the internal combustion engine is a normal value, the lift amount of the intake value may be set to the third set value that is larger than the first set value during the period from when the starting of the internal combustion engine is initiated until when the internal combustion engine is shifted to the perfect combustion state. Thus, an air-fuel mixture in which fuel and air are sufficiently mixed with each other is formed. It is, therefore, possible to shift the internal combustion engine to the initial combustion state in a short time after starting of the internal combustion engine is initiated, and to shift the internal combustion engine to the perfect combustion state after shifting the internal combustion engine to the initial combustion state. As a result, it is possible to improve startability of the internal combustion engine.

When the temperature of the internal combustion engine is higher than the second predetermined temperature, the controller may set the lift amount to a fourth set value that is smaller than the second set value during the period from when starting of the internal combustion engine is initiated until when the internal combustion engine is shifted to the perfect combustion state.

When the temperature of the internal combustion engine is considerably high, the amount of fuel required when the internal combustion engine is started is small. Accordingly, the lift amount of the intake valve may be small. Therefore, when the temperature of the internal combustion engine is higher than the second predetermined temperature, that is, when the temperature of the internal combustion engine is high, the lift amount of the intake valve may be set to the fourth set value that is smaller than the second set value during the period from when starting of the internal combustion engine is initiated until when the internal combustion engine is shifted to the perfect combustion state. Thus, the amount of air taken in the combustion chamber when the internal combustion engine is started can be reduced by setting the lift amount of the intake valve to a relatively small value. Thus, it is possible to reduce a possibility that a large amount of air is taken in the combustion chamber from a surge tank when the internal combustion engine is restarted while the temperature thereof is high. Also, it is possible to suppress occurrence of unnecessary racing of the engine.

In the first aspect, the variable valve mechanism may change valve opening timing and valve closing timing of the intake valve in addition to the lift amount of the intake valve. Also, the controller may set a valve opened period of the intake valve such that the valve opened period is increased/decreased in synchronization with an increase/decrease in the lift amount.

With this structure, the lift amount and the valve opened period (working angle) are increased/decreased in synchronization with each other. Namely, when the lift amount is decreased, the working angle is also decreased. Accordingly, when the intake valve is opened while starting of the internal combustion engine is initiated, both the lift amount and the working angle are small. Therefore, as compared with the case where only the lift amount is made small, air flows in the combustion chamber at a high speed, and a large turbulence of the air-fuel mixture occurs in the combustion chamber. Since atomization of the fuel is further promoted, it is possible to realize more appropriate combustion, and to shift the internal combustion engine in a shorter time after starting of the internal combustion engine is initiated. As a result, it is possible to improve startability of the internal combustion engine.

In the above-mentioned structure, the controller may set the valve closing timing of the intake valve to timing at which a piston reaches a bottom dead center during a period from when the internal combustion engine is shifted to the initial combustion state until when the internal combustion engine is shifted to the perfect combustion state.

With this structure, the valve closing timing of the intake valve is set to the timing at which the piston reached the bottom dead center during the period from when the internal combustion engine is shifted to the initial combustion state until when the internal combustion engine is shifted to the perfect combustion state. Accordingly, a large amount of air can be supplied to the combustion chamber. Thus, a large amount of air having a high temperature can be supplied to a catalyst which processes exhaust gas, immediately after starting of the internal combustion engine is initiated, and warming of the catalyst can be promoted. It is, therefore, possible to warm the catalyst in a relatively short time immediately after starting of the internal combustion engine is initiated, and to satisfy a requirement concerning emission.

BRIEF DESCRIPTION OF THE DRAWINGS

The forgoing and further objects, features and advantages of the invention will become apparent from the following description of preferred embodiments with reference to the accompanying drawings, wherein like numerals are used to represent like elements and wherein:

FIG. 2 is a flowchart for describing a control routine of an electronic control unit, which is used when the internal combustion engine is started;

DETAILED DESCRIPTION OF THE EXEMPLARY EMBODIMENTS

Hereafter, a control apparatus for an internal combustion engine according to an embodiment of the invention will be described with reference to FIGS. 1, 2, 3A, 3B, and 3C.

Figure 1:
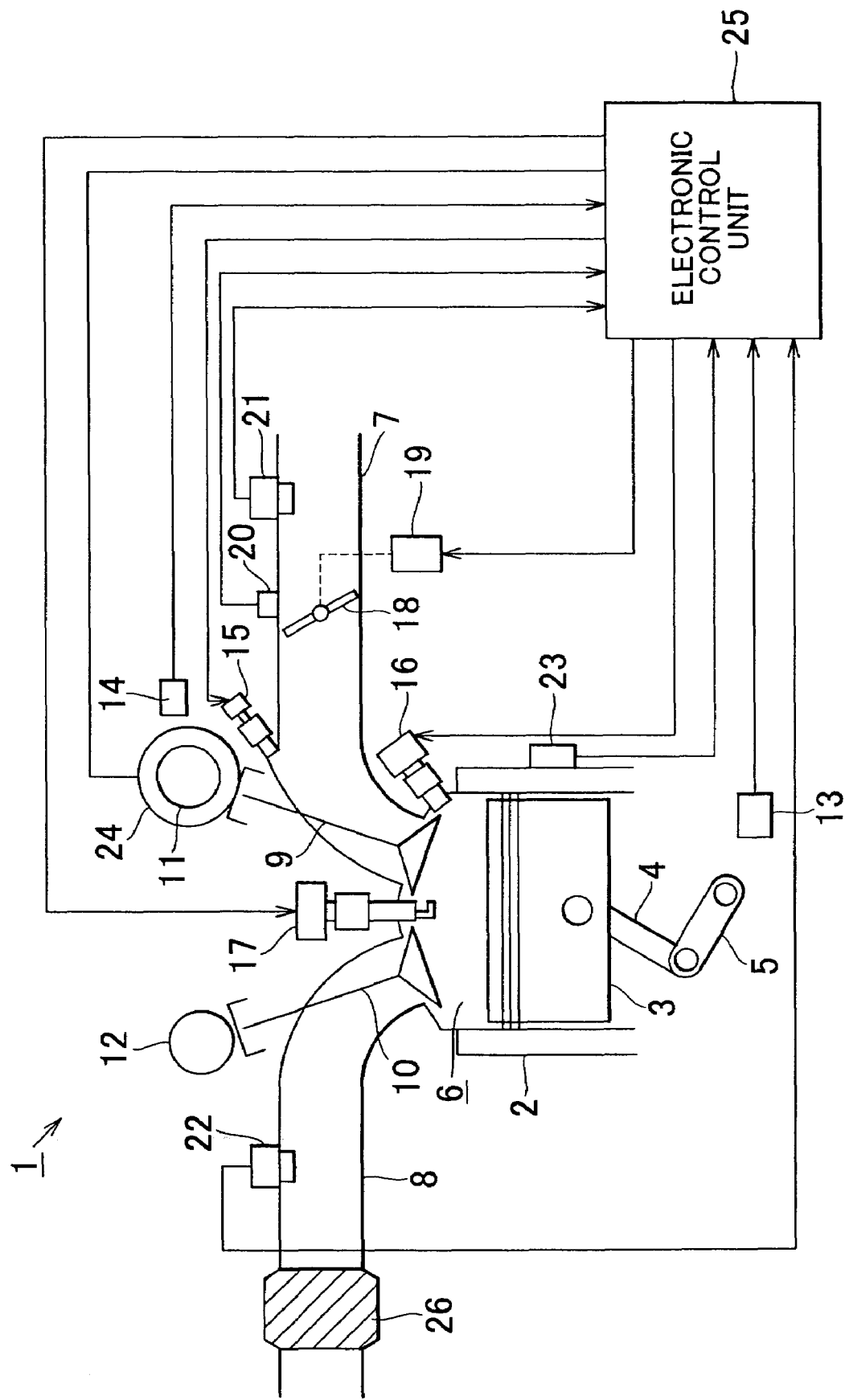
FIG. 1 is a view schematically showing a structure of a control apparatus for an internal combustion engine according to an embodiment of the invention.

FIG. 1 is a view schematically showing a structure of an internal combustion engine 1. The internal combustion engine 1 is mounted in a vehicle, for example, as a power source for the vehicle. The internal combustion engine 1 includes multiple cylinders 2 (only one of the multiple cylinders 2 is shown in FIG. 1), and a piston 3 is housed in each of the cylinders 2 such that the piston 3 can reciprocate in the cylinder 2. The piston 3 is connected to a crankshaft 5 serving as an output shaft of the internal combustion engine 1 via a connecting rod 4. Reciprocation of the piston 3 is converted into a rotational movement by the connecting rod 4, and then transmitted to the crankshaft 5.

A combustion chamber 6 of each cylinder 2 is connected to an intake passage 7 through which air is supplied to the combustion chamber 6, and an exhaust passage 8 through which exhaust gas is discharged from the combustion chamber 6. The cylinder 2 is provided with an intake valve 9 located on the intake passage 7 side, and an exhaust valve 10 located on the exhaust passage 8 side. The internal combustion engine 1 includes an intake side cam shaft 11 which opens/closes the intake valve 9, and an exhaust side cam shaft 12 which opens/closes the exhaust valve 10.

The intake side cam shaft 11 and the exhaust side cam shaft 12 are connected to the crankshaft 5 via a pulley and a belt (not shown), or via a pulley and a chain (not shown). The intake side cam shaft 11 and the exhaust side cam shaft 12 are rotated in synchronization with the crankshaft 5, whereby the intake side cam shaft 11 opens/closes the intake valve 9 at predetermined timing, and the exhaust side cam shaft 12 opens/closes the exhaust valve 10 at predetermined timing. In the internal combustion engine 1, while the crankshaft 5 rotates twice, each of the intake side cam shaft 11 and the exhaust shaft cam shaft 12 rotates once. Also, the intake valve 9 and the exhaust valve 10 open/close at predetermined timing in accordance with the reciprocation of the piston 3.

A crank angle sensor 13 which outputs a detection signal indicating a rotational angle of the crankshaft 5 is provided near the crankshaft 5. The detection signal output from the crank angle sensor 13 is used when a phase angle (a crank angle) of the crankshaft 5 and an engine rotational speed are calculated. Also, a cam angle sensor 14 which outputs a detection signal indicating a rotational angle of the intake side cam shaft 11 is provided near the intake side cam shaft 11. The detection signals output from the crank angle sensor 13 and the cam angle sensor 14 are used when a cam angle of the intake side cam shaft 11 (a relative phase angle with respect to the crankshaft 5) is calculated.

The intake passage 7 of each cylinder 2 is provided with an intake passage fuel injection valve 15 which injects fuel into the intake passage 7. Each cylinder 2 is provided with an in-cylinder fuel injection valve 16 which directly injects fuel into the combustion chamber 6. Namely, the internal combustion engine 1 includes two fuel injection valves, that are, the intake passage fuel injection valve 15 and the in-cylinder fuel injection valve 16. In the internal combustion engine 1, fuel is injected under high pressure from one of or both the intake passage fuel injection valve 15 and the in-cylinder fuel injection valve 16 based on a state of the internal combustion engine 1, for example, an engine rotational speed and an engine load. The injected fuel is mixed with the air supplied through the intake passage 7, whereby an air-fuel mixture for combustion is formed. Note that, the engine load is defined based on, for example, a parameter related to an amount of air taken in the internal combustion engine 1. Examples of the parameter include a throttle valve opening amount, an accelerator pedal operation amount, and an intake air pressure.

A spark plug 17 which ignites the air-fuel mixture in the combustion chamber 6 is attached to each cylinder 2. When the air-fuel mixture in the combustion chamber 6 is burned and expanded due to ignition performed by the spark plug 17, the piston 3 reciprocates due to the combustion gas, and the crankshaft 5 is rotated, whereby output torque of the internal combustion engine 1 can be obtained. Also, a throttle valve 18 which controls an amount of air taken in the combustion chamber 6 is provided in the intake passage 7. The throttle valve 18 is connected to an actuator 19 serving as a drive source for opening/closing the throttle valve 18. The actuator 19 is driven based on an operation amount of an accelerator pedal (not shown), whereby a throttle valve opening amount is controlled.

A throttle valve opening amount sensor 20 which detects the opening amount of the throttle valve 18 is provided near the throttle valve 18. A thermal air flow meter 21 which detects an amount of air taken in the combustion chamber 6 is attached to the intake passage 7 at a position upstream of the throttle valve 18. Also, each cylinder 2 is provided with a coolant temperature sensor 23 serving as an engine temperature detector for detecting a temperature of a coolant for the internal combustion engine 1.

An air-fuel ratio sensor 22 which outputs a detection signal indicating an oxygen concentration (an air concentration) in the exhaust gas is attached to the exhaust passage 8. Also, an exhaust gas control catalytic converter 26 is provided in the exhaust passage 8 at a position downstream of the air-fuel ratio sensor 22.

The intake side cam shaft 11 is provided with a variable valve mechanism 24. The variable valve mechanism 24 includes a valve working angle control mechanism which continuously changes a lift amount and a working angle of the intake valve 9, and a valve timing control mechanism which continuously changes valve timing of the intake valve 9 (hereinafter, referred to as a "VVT mechanism"). The valve working angle control mechanism changes the lift amount and the working angle that indicates a valve opened period in synchronization with each other by performing electric control. The valve working angle control mechanism can continuously increase or decrease both the lift amount and the working angle of the intake valve 9. The VVT mechanism changes a relative phase of the intake side cam shaft 11 with respect to the crankshaft 5 by performing hydraulic control. The VVT mechanism can continuously advance or retard the valve timing of the intake valve 9.

The internal combustion engine 1 is controlled by an electronic control unit 25 including various devices such as a CPU, ROM, RAM, an ASIC and I/F. Various programs including an engine start program are stored in the ROM of the electronic control unit 25, as programs for controlling the internal combustion engine 1. The electronic control unit 25 corresponds to a determining device and a controller.

FIG. 2 is a flowchart for describing a control routine of the electronic control unit 25, which is used when the internal combustion engine 1 is started. FIG. 3 indicates timing charts showing states of the internal combustion engine 1 when the internal combustion engine 1 is started.

When a driver of the vehicle including the internal combustion engine 1 gives an instruction to initiate starting of the internal combustion engine 1 by operating an ignition key, the control routine is started. In step S1, it is determined whether a temperature of a coolant for the internal combustion engine 1, which is detected based on a detection signal output from the coolant temperature 23, is equal to or lower than a first reference temperature T1. As the first reference temperature T1, a temperature in a considerably low temperature range, for example, −20° C. is used. When it is determined that the coolant temperature is equal to or lower than the first reference temperature T1, step S2 is performed.

In step S2, the variable valve mechanism 24 is operated, and the working angle of the intake valve 9 is set to a first set value A1. As the first set value A1, a relatively small value is used. For example, when the working angle that is used when the internal combustion engine 1 operates normally is set to 250 degrees, 120 degrees is used as the first set value A1.

In step S3, it is determined whether an engine rotational speed, which is detected based on the detection signal output from the crank angle sensor 13, is equal to or higher than a reference rotational speed n1. As the reference rotational speed n1, a rotational speed at which the internal combustion engine 1 has been shifted to the perfect combustion state is used. The state where the internal combustion engine 1 has been shifted to the perfect combustion state is the state where the internal combustion engine 1 is rotating by itself without using a starter motor. Accordingly, as the reference rotational speed n1, for example, a set idle rotational speed, more specifically, a value of approximately 1000 rpm to approximately 1200 rpm is used.

When the engine rotational speed is lower than the reference rotational speed n1, it can be determined that the internal combustion engine 1 has been shifted to the initial combustion state although the internal combustion engine 1 has not been shifted to the perfect combustion state. Accordingly, step S4 is performed. Such a determination can be made when a processing speed of the electronic control unit 25 is relatively slow. More specifically, such a determination can be made when the internal combustion engine 1 can be shifted to the initial combustion state although the internal combustion engine 1 cannot be shifted to the perfect combustion state during a period from when the electronic control unit 25 performs one step until when the electronic control unit 25 performs the next step, that is, during a period from when the electronic control unit 25 sets the working angle of the intake valve 9 to the first set value until when the electronic control unit 25 detects the engine rotational speed.

In step S4, the variable valve mechanism 24 is operated, and the working angle of the intake valve 9 is increased by "α" degrees, and the working angle of the intake valve 9 is set to a value obtained by adding "α" degrees to the previous working angle (previous working angle+α), that is, a second set value A2. The initial value of the previous value is A1. It is needless to say the initial value of the second set value A2 (=A1+α) is larger than the first set value A1. However, the initial value of the second set value A2 is set to a value smaller than the working angle which is used when the internal combustion engine 1 operates normally.

When it is determined in step S3 that the detected engine rotational speed is equal to or higher than the reference rotational speed n1, it can be determined that the internal combustion engine 1 has been shifted to the perfect combustion state. Accordingly, the engine starting routine ends.

Figure 3A:
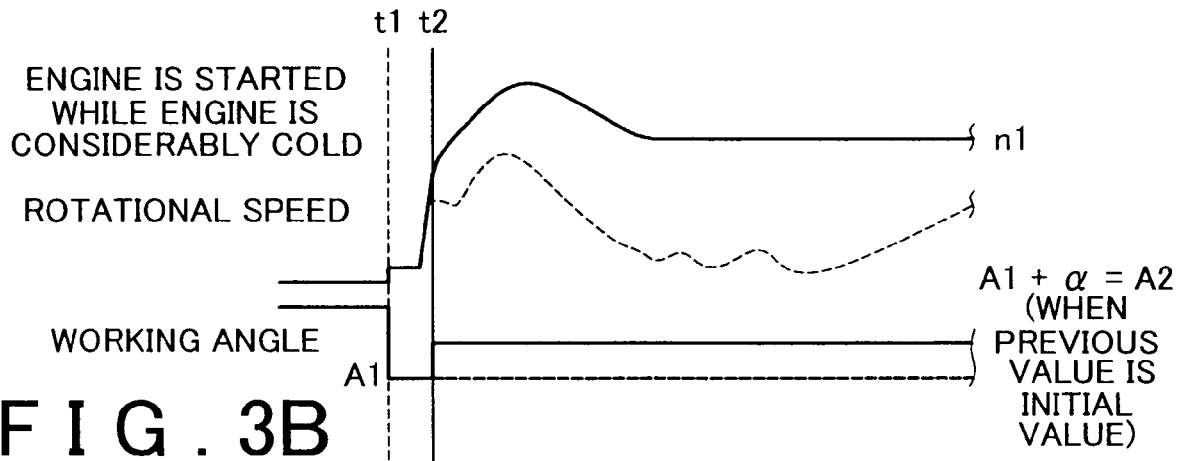
FIGS. 3A, 3B and 3C are timing charts showing states of the internal combustion engine when the internal combustion engine is started, FIG. 3A showing a state when the internal combustion engine is started while a temperature of the internal combustion engine is considerably low, FIG. 3B showing a state when the internal combustion engine is started while the temperature of the internal combustion is a normal value, and FIG. 3C showing a state when the internal combustion engine is started while the internal combustion engine is warm.

When the internal combustion engine 1 is started while the temperature of the internal combustion engine 1 is considerably low, for example, when the coolant temperature is equal to or lower than −20° C., if an instruction to initiate starting of the internal combustion engine 1 is given at time t1, the working angle of the intake valve 9 is set to the first set value A1, as shown in FIG. 3A. The engine rotational speed is maintained at a constant value by the starter motor immediately after starting of the internal combustion engine 1 is initiated. Then, the engine rotational speed is gradually increased since combustion and expansion occur intermittently in some of the cylinders 2. The state where combustion and expansion occur intermittently in some of the cylinders 2 is the initial combustion state.

When it is determined that the internal combustion engine 1 has been shifted to the initial combustion state at time t2, the working angle of the intake valve 9 is set to the second set value A2 (=previous value+α). Thus, the engine rotational speed increases, and finally, combustion and expansion occur continuously in all the cylinders 2, and the internal combustion engine 1 is shifted to the perfect combustion state where the internal combustion engine 1 can operates by itself without using the starter motor. If the working angle of the intake valve 9 is maintained at the first set value A1, the period until the engine rotational speed reaches the reference rotational speed n1 becomes long, as compared with the case where the working angle of the intake valve 9 is set to the second set value A2, as indicated by a dashed line in FIG. 3A. If the engine rotational speed does not reach the reference rotational speed n1 even when the working angle is set to the second set value A2, the working angle is further increased by "α" degrees in order to reduce the engine starting period. When the engine rotational speed becomes equal to or higher than the reference rotational speed n1, namely, when the internal combustion engine 1 has been shifted to the perfect combustion state, the engine starting routine ends.

When it is determined in step S1 that the coolant temperature is higher than the first reference temperature T1, step S5 is performed. In step S5, it is determined whether the temperature of the coolant for the internal combustion engine 1, which is detected based on the detection signal output from the coolant temperature sensor 23, is equal to or lower than a second reference temperature T2. As the second reference temperature T2, a temperature in a normal temperature range, for example, 50° C. is used. When it is determined in step S5 that the coolant temperature is equal to or lower than the second reference temperature T2, step S6 is performed.

In step S6, the variable valve mechanism 24 is operated, and the working angle of the intake valve 9 is set to a third set value A3. As the third set value A3, a value which is larger than the first set value A1 and smaller than the initial value of the second set value A2 (=A1+α) is used.

In step S7, the variable valve mechanism 24 is operated, and the valve closing timing of the intake valve 9 is set to timing at which the piston 3 reaches the bottom dead center (BDC). If the valve closing timing cannot be set to the timing at which the piston 3 reaches the bottom dead center (BDC) by controlling the working angle using only the working angle control mechanism, the valve timing control mechanism is operated in order to set the valve closing timing to the timing at which the piston 3 reaches the bottom dead center (BDC). After step S7 is completed, the engine starting routine ends.

Figure 3B:
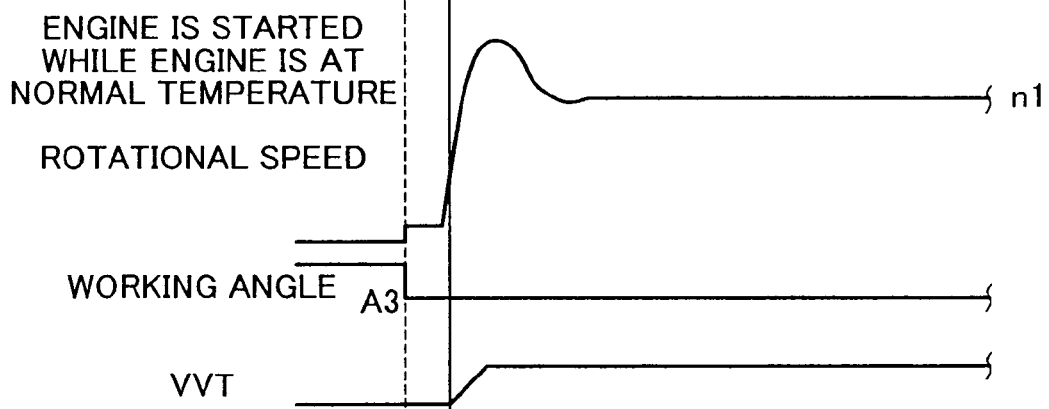

When the internal combustion engine 1 is started while the temperature of the internal combustion engine is a normal value, for example, when the coolant temperature is equal to or lower than 50° C., if an instruction to initiate starting of the internal combustion engine 1 is given at time t1, the working angle of the intake valve 9 is set to the third set value A3, as shown in FIG. 3B. The third set value A3 is larger than the first set value A1 that is used when the internal combustion engine 1 is started while the temperature of the internal combustion engine 1 is considerably low, and smaller than the initial value of the second set value A2 (=A1+α).

When the internal combustion engine 1 is started while the temperature of the internal combustion engine 1 is a normal value, fuel is atomized appropriately, as compared with the case where the internal combustion engine 1 is started while the temperature of the internal combustion engine 1 is considerably low. Accordingly, if the working angle of the intake valve 9 is excessively small, the amount of intake air is decreased, raising a possibility that fuel and air are not sufficiently mixed with each other. Therefore, the working angle of the intake valve 9 is set to the third set value A3 that is larger than the first set value A1. As a result, the air-fuel mixture in which fuel and air are sufficiently mixed with each other is formed, and the internal combustion engine 1 can be shifted to the initial combustion state in a short time after starting of the internal combustion engine 1 is initiated. Thus, the engine rotational speed is maintained at a constant value by the starter motor immediately after starting of the internal combustion engine 1 is initiated. After this, since combustion and expansion intermittently occur in some of the cylinders 2, the engine rotational speed is gradually increased and the internal combustion engine 1 is shifted to the initial combustion state.

When the fact that the internal combustion engine 1 has been shifted to the initial combustion state is detected at time t2, the valve closing timing of the intake valve 9 is set to the timing at which the piston 3 reaches the bottom dead center (BDC). Thus, since a large amount of air can be supplied to the combustion chamber 6, a large amount of exhaust gas having a high temperature can be supplied to the exhaust gas control catalytic converter 26. Accordingly, a catalyst can be warmed in a relatively short time immediately after starting of the internal combustion engine 1 is initiated, and an exhaust gas process suitable for a requirement concerning exhaust emission can be performed.

When it is determined in step S5 that the coolant temperature is higher than the second reference temperature T2, step S9 is performed. In step S9, the variable valve mechanism 24 is operated, and the working angle of the intake valve 9 is set to a fourth set value A4. As the fourth set value A4, a value which is smaller than the initial value of the second set value (=A1+α) is used. For example, as the fourth set value, a relatively small value is used. After step S9 is completed, the engine starting routine ends.

Figure 3C:
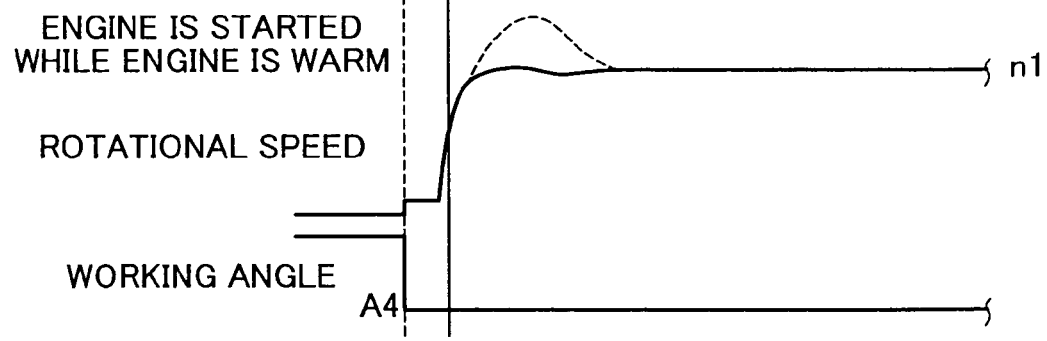

When the internal combustion engine 1 is started while the internal combustion engine 1 is warm, for example, when the coolant temperature is higher than 50° C., if an instruction to initiate starting of the internal combustion engine 1 is given at time t1, the working angle of the intake valve 9 is set to the fourth set value A4, as shown in FIG. 3C.

If the internal combustion engine 1 is warm, the amount of fuel required when the internal combustion engine 1 is started is small. Accordingly, the working angle of the intake valve 9 may be small. Therefore, since the working angle of the intake valve 9 is set to the fourth set value A4 that is smaller than the initial value of the second set value A2 (=A1+α), that is, a relatively small value, the amount of air taken in the combustion chamber 6 when starting of the internal combustion engine 1 is initiated can be made small. Thus, the engine rotational speed is maintained at a constant value by the starter motor immediately after starting of the internal combustion engine 1 is initiated. After this, combustion and expansion occur intermittently in some of the cylinders 2, and the engine rotational speed gradually increases, and the internal combustion engine 1 is shifted to the initial combustion state. Also, the working angle of the intake valve 9 is set to the fourth set value A4 that is a relatively small value, reducing a possibility that a large amount of the air is taken in the combustion chamber 6 from the surge tank immediately after starting of the internal combustion engine is initiated. It is, therefore, possible to suppress occurrence of unnecessary racing of the internal combustion engine 1 shown by a dashed line in FIG. 3C.

According to the above-mentioned embodiment of the invention, the following effects can be obtained.

(1) When the internal combustion engine 1 is started while the temperature of the internal combustion engine 1 is considerably low, the working angle of the intake valve 9 is set to, for example, the first set value A1 that is a relatively small value during a period from when starting of the internal combustion engine 1 is initiated until when the internal combustion engine 1 is shifted to the initial combustion state. Accordingly, air is taken in the combustion chamber 6 at a high speed, and, therefore, turbulence of the air-fuel mixture occurs in the combustion chamber 6.

Accordingly, atomization of the fuel is promoted, and the initial combustion state can realized more promptly. After this, the lift amount of the intake valve 9 is set to the second set value A2 that is larger than the first set value A1, and, therefore, a larger amount of air is supplied to the combustion chamber 6. It is, therefore, possible to increase an engine output, thereby shifting the internal combustion engine 1 to the perfect combustion state in a shorter time, and to stably maintain the perfect combustion state. According to the embodiment, it is, therefore, possible to shift the internal combustion engine 1 to the perfect combustion state in a short time after starting of the internal combustion engine 1 is initiated, and to stably maintain the perfect combustion state. As a result, startability of the internal combustion engine 1 can be improved.

(2) When the internal combustion engine 1 is started while the temperature of the internal combustion engine 1 is a normal value, the working angle of the intake valve 9 is set to the third set value A3 that is larger than the first set value A1 in the period from when starting of the internal combustion engine 1 is initiated until when the internal combustion engine is shifted to the initial combustion state. Accordingly, a sufficient amount of air can be supplied to the combustion chamber 6, and, therefore, an air-fuel mixture in which fuel and air are sufficiently mixed with each other can be formed. Thus, it is possible to shift the internal combustion engine 1 to the initial combustion state in a short time after starting of the internal combustion engine 1 is initiated. During the period from when the internal combustion engine 1 is shifted to in the initial combustion state until when the internal combustion engine 1 is shifted to in the perfect combustion state, the valve closing timing of the intake valve 9 is set to the timing at which the piston 3 reaches the bottom dead center (BDC). Accordingly, a large amount of air can be supplied to the combustion chamber 6, and, therefore, an amount of air required for shifting the internal combustion engine 1 to the perfect combustion state can be supplied to the combustion chamber 6. Thus, it is possible to shift the internal combustion engine 1 to the perfect combustion state in a short time after the internal combustion engine 1 is shifted to the initial combustion state. Since the internal combustion engine 1 can be shifted to the perfect combustion state in a short time after starting of the internal combustion engine 1 is initiated, startability of the internal combustion engine 1 while the temperature of the internal combustion engine 1 is a normal value can be improved.

(3) When the internal combustion engine 1 is started while the temperature of the internal combustion engine 1 is a normal value, the valve closing timing of the intake valve 9 is set to the timing at which the piston 3 reaches the (bottom dead center) BDC during the period from when the internal combustion engine 1 is shifted to the initial combustion state until when the internal combustion engine 1 is shifted to the perfect combustion state. Accordingly, a large amount of air can be supplied to the combustion chamber 6, and, therefore, a large amount of air having a high temperature can be supplied to the exhaust gas control catalytic converter 26 which processes exhaust gas, immediately after starting of the internal combustion engine 1 is initiated. As a result, it is possible to warm the catalyst in a relatively short time immediately after starting of the internal combustion engine 1 is initiated, and to satisfy a requirement concerning exhaust emission.

(4) When the internal combustion engine 1 is started while the temperature of the internal combustion engine 1 is high (while the internal combustion engine 1 is warm), the working angle of the intake valve 9 is set to the fourth set value A4 that is smaller than the initial value of the second set value A2 (=A1+α). Accordingly, the amount of air taken in the combustion chamber 6 when the internal combustion engine 1 is started can be made small. It is, therefore, possible to reduce the possibility that a large amount of air is taken in the combustion chamber 6 from the surge tank when starting of the internal combustion engine 1 is initiated, and to suppress occurrence of unnecessary racing of the internal combustion engine 1. When the internal combustion engine 1 is warm, the amount of fuel required when the internal combustion engine 1 is started is small. Accordingly, even if the working angle of the intake valve 9 is small, startability of the internal combustion engine 1 does not deteriorate.

(5) When a processing speed of the electronic control unit 25 is relatively slow, the internal combustion engine 1 can be shifted to the initial combustion state in the period from when the working angle of the intake valve 9 is set to the first set value A1 until when the next step is performed, that is, until when the engine rotational speed is initially detected. Accordingly, the electronic control unit 25 can determine that the internal combustion engine 1 is in the initial combustion state, when the engine rotational speed has not reached the reference rotational n1 corresponding to the perfect combustion state after the working angle of the intake valve 9 is set. Therefore, the lift amount of the intake valve 9 is set to the first set value A1 during the period from when starting of the internal combustion engine 1 is initiated until when the engine rotational speed is initially detected. After the engine rotational speed is initially detected, the lift amount of the intake valve 9 is set to the second set value A2 that is larger than the first set value A1 until the engine rotational speed becomes equal to or higher than the reference rotational speed n1. Accordingly, starting of the internal combustion engine 1 can be controlled by performing a relatively easy process.

(6) The variable valve mechanism 24 increases/decreases the working angle and the lift amount of the intake valve 9 in synchronization with each other. Namely, if the working angle decreases, the lift amount also decreases. Both the working angle and the lift amount are small, when the intake valve 9 is opened while starting of the internal combustion engine 1 is initiated. Accordingly, as compared with the case where only one of the working angle and the lift amount is made small, air is introduced into the combustion chamber 6 at a high speed, and large turbulence of air-fuel mixture occurs in the combustion chamber 6. Since atomization of the fuel is further promoted, more appropriate combustion can be performed, and the internal combustion engine 1 can be shifted to the initial combustion state in a shorter time after starting of the internal combustion engine 1 is initiated. As a result, startability of the internal combustion engine 1 can be improved.

Note that, the embodiment may be modified as follows.

The process in which the working angle of the intake valve 9 is changed in two steps may be performed when the internal combustion engine 1 is started while the temperature of the internal combustion engine 1 is a normal value or when the internal combustion engine 1 is warm. The amount of fuel required to shift the internal combustion engine 1 to the initial combustion state is smaller than the amount of fuel required to shift the internal combustion engine 1 to the perfect combustion state, regardless of the temperature of the internal combustion engine 1.

It may be determined that the internal combustion engine 1 is in the initial combustion state if the engine rotational speed has not reached the reference rotational speed n1 corresponding to the perfect combustion state even when a predetermined period has elapsed since starting of the internal combustion engine 1 is initiated. Such a determination is made when the processing speed of the electronic control unit 25 is relatively fast, and, therefore, the internal combustion engine 1 cannot be shifted to the initial combustion state in the period from when the working angle of the intake valve 9 is set to the first set value A1 until when the next step is performed, that is, until when the engine rotational speed is initially detected. In this case, therefore, the working angle of the intake valve 9 is set to the first set value A1 in the period from when starting of the internal combustion engine 1 is initiated until when a predetermined period has elapsed. After the predetermined period has elapsed, the working angle of the intake valve 9 is set to the second set value A2 that is larger than the first set value A1 until the engine rotational speed reaches the reference rotational speed n1. In this case as well, starting the internal combustion engine 1 can be controlled by performing a relatively easy process.

It may be determined that the internal combustion engine 1 is in the initial combustion state when the engine rotational speed has reached the reference rotational speed corresponding to the initial combustion state after starting of the internal combustion engine 1 is initiated. Such a determination can be made since there is a correlation between the engine rotational speed and the combustion state of the internal combustion engine 1. Accordingly, the working angle of the intake valve 9 is set to the first set value A1 during the period from when starting of the internal combustion engine 1 is initiated until when the engine rotational speed reaches the reference rotational speed corresponding to the initial combustion state. After the engine rotational speed has reached the reference rotational speed corresponding to the initial combustion state, the working angle is set to the second set value A2 until the engine rotational speed reaches the reference rotational speed n1. Thus, starting of the internal combustion engine 1 can be controlled accurately. It is needless to say that the second set value A2 may be increased in a stepwise manner.

Figure 4:
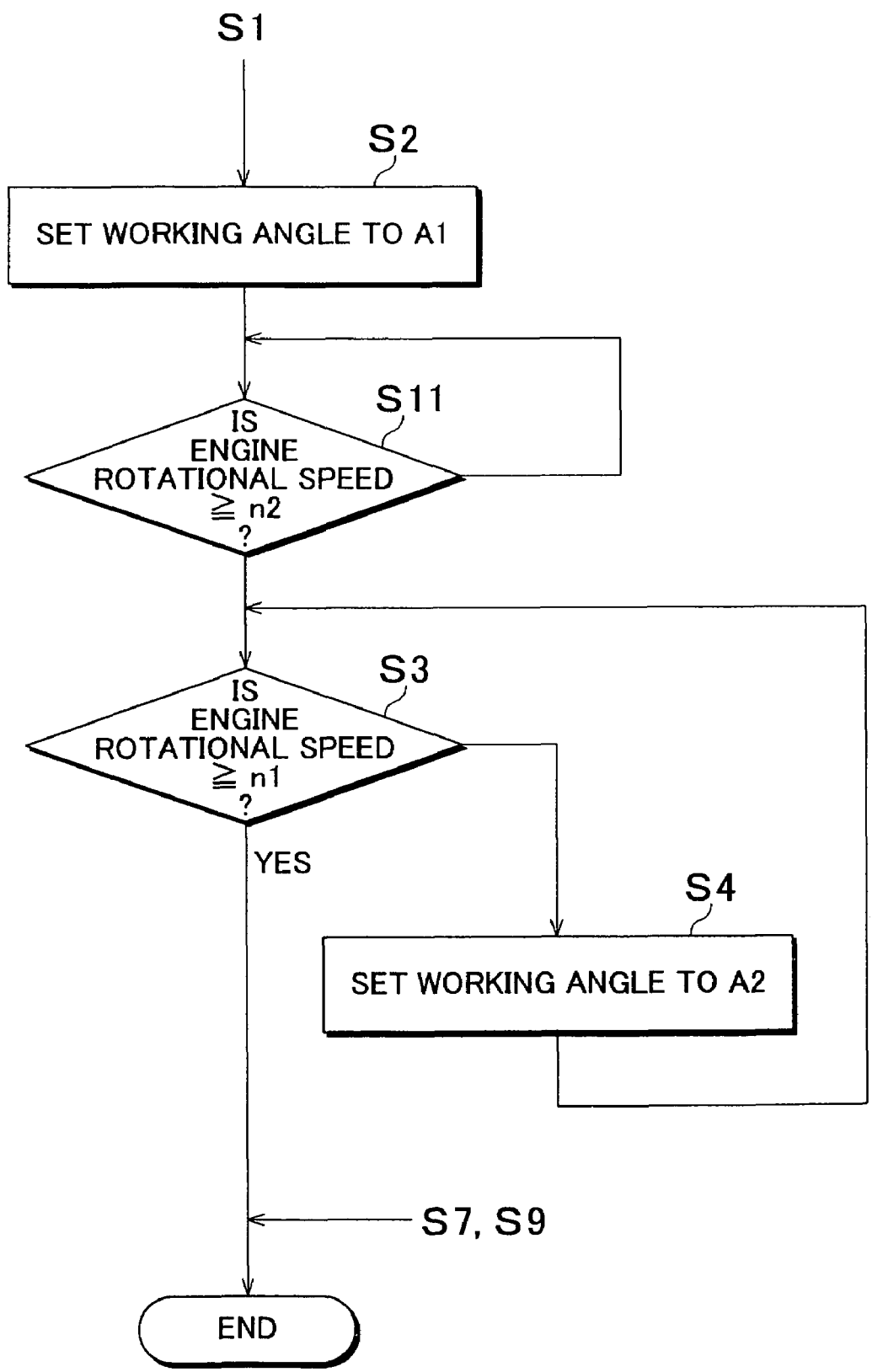
FIG. 4 is a flowchart for describing another control routine of the electronic control unit, which is used when the internal combustion engine is started.

FIG. 4 is a flowchart showing the control routine for maintaining the shift amount at the first set value A1 when the engine rotational speed is lower than the reference rotational speed n2 corresponding to the initial combustion state after starting of the internal combustion engine 1 is initiated. If the temperature of the coolant for the internal combustion engine 1 is a value in the considerably low temperature range after starting of the internal combustion engine 1 is initiated, the variable valve mechanism 24 is operated, and the working angle of the intake valve 9 is set to the first set value A1. In step S11, it is determined whether the engine rotational speed detected based on the detection signal output from the crank sensor 13 is equal to or higher than the reference rotational speed n2. As the reference rotational speed n2, the rotational speed that is obtained when the internal combustion engine 1 is shifted the initial combustion state is used. When the engine rotational speed is lower than the reference rotational speed n2, it is determined that the internal combustion engine 1 has not been shifted to the initial combustion state, and the working angle of the intake valve 9 is maintained at the first set value A1. On the other hand, when it is determined in step S11 that the engine rotational speed is equal to or higher than the reference rotational speed n2, it is determined that the internal combustion engine 1 has been shifted to the initial combustion state. Then, it is determined in step S3 whether the internal combustion engine 1 has been shifted to the perfect combustion state. Since the other steps are the same as those in the flowchart in FIG. 2, the description thereof will not be made here.

Only one of the working angle and the lift amount of the intake valve 9 may be changed. If one of the working angle and the lift amount is decreased, the amount of air taken through the intake valve 9 is decreased. If only the lift amount is reduced, an inlet of the intake valve 9 become small, as compared with the case where only the working angle is decreased. It is, therefore, possible to increase the speed of air flowing in the combustion chamber 6, and to cause a large turbulent in the air taken in through the intake valve 9.

The process in which the valve closing timing of the intake valve 9 is set to the timing at which the piston 3 reaches the bottom dead center (BDC) during the period from when the internal combustion engine 1 is shifted to the initial combustion until when the internal combustion engine 1 is shifted to the perfect combustion may be performed when the internal combustion engine 1 is started while the temperature of the internal combustion engine 1 is considerably low, or while the internal combustion engine 1 is warm. Thus, even when the internal combustion engine 1 is started while the temperature of the internal combustion engine 1 is considerably low, or while the internal combustion engine 1 is warm, it is possible to warm the catalyst in a relatively short time immediately after starting of the internal combustion engine 1 is initiated, and to satisfy the requirement concerning the emission. Note that, when the valve closing timing is changed while the temperature of the internal combustion engine 1 is considerably low, the VVT mechanism which changes the valve closing timing by electric control needs to be used. The VVT mechanism which changes the valve closing timing by hydraulic control has a problem that, when the temperature of the internal combustion engine 1 is considerably low, the operation is slow since the oil hardens, and the desired operation cannot be performed in a short time.

The temperature of the internal combustion engine 1 may be obtained based on the temperature of lubrication oil supplied to rotational portions of the crankshaft 5, and the like.

In the above-mentioned embodiments, the invention is applied to the engine having both the intake passage fuel injection valve and the in-cylinder fuel injection valve. However, the invention may be applied to an in-cylinder injection engine or a port-injection engine.

What is claimed is:

1. A control apparatus for an internal combustion engine comprising:

a variable valve mechanism which can change at least a lift amount of an intake valve as an opening/closing characteristic of the intake valve;

a controller which sets the lift amount to a predetermined first set value by using the variable valve mechanism when starting of the internal combustion engine is initiated, and then changes the lift amount to a second set value that is larger than the first set value before the internal combustion engine is shifted to a perfect combustion state; and a determining device which determines a combustion state of the internal combustion engine, wherein, before the lift amount of the intake valve is changed, the controller maintains the lift amount at the first set value until the determining device determines that the internal combustion engine has been shifted to an initial combustion state after starting of the internal combustion engine is initiated.

2. The control apparatus for an internal combustion engine according to claim 1, further comprising:
    a rotational speed detector which detects an engine rotational speed of the internal combustion engine, wherein,
    before the engine rotational speed detected by the rotational speed detector reaches a reference value corresponding the perfect combustion state after the lift amount is set to the lift amount is set to the predetermined first set value, the controller changes the lift amount to the second set value that is larger than the first set value.

3. The control apparatus for an internal combustion engine according to claim 1, wherein
    the determining device monitors an engine rotational speed as a factor related to the combustion state of the internal combustion engine, and,
    before the lift amount of the intake valve is changed, the controller maintains the lift amount at the first set value until the determining device determines that the engine rotational speed of the internal combustion engine has reached an engine rotational speed corresponding to the initial combustion state after starting of the internal combustion engine is initiated.

4. The control apparatus for an internal combustion engine according to claim 1, wherein
    the variable valve mechanism can change valve opening timing and valve closing timing of the intake valve in addition to the lift amount of the intake valve, and
    the controller sets a valve opened period of the intake valve such that the valve opened period is increased/decreased in synchronization with an increase/decrease in the lift amount.

5. The control apparatus for an internal combustion engine according to claim 4, wherein
    the controller sets the valve closing timing of the intake valve to timing at which a piston reaches a bottom dead center during a period from when the internal combustion engine is shifted to the initial combustion state until when the internal combustion engine is shifted to the perfect combustion state.

6. A control apparatus for an internal combustion engine comprising:
    a variable valve mechanism which can change at least a lift amount of an intake valve as an opening/closing characteristic of the intake valve;
    a controller which sets the lift amount to a predetermined first set value by using the variable valve mechanism when starting of the internal combustion engine is initiated, and then changes the lift amount to a second set value that is larger than the first set value before the internal combustion engine is shifted to a perfect combustion state; and
    an engine temperature detector which detects a temperature of the internal combustion engine when starting of the internal combustion engine is initiated, wherein,
    when the temperature of the internal combustion engine is equal to or lower than a first predetermined temperature, the controller changes the lift amount to the second set value that is larger than the first set value before the internal combustion engine is shifted to the perfect combustion state.

7. The control apparatus for an internal combustion engine according to claim 6, wherein,
    when the temperature of the internal combustion engine is equal to or lower than a second predetermined temperature that is higher than the first predetermined temperature, the controller sets the lift amount to a third set value that is larger than the first set value during a period from when starting of the internal combustion engine is initiated until when the internal combustion engine is shifted to the perfect combustion state.

8. The control apparatus for an internal combustion engine according to claim 7, wherein,
    when the temperature of the internal combustion engine is higher than the second predetermined temperature, the controller sets the lift amount to a fourth set value that is smaller than the second set value during the period from when starting of the internal combustion engine is initiated until when the internal combustion engine is shifted to the perfect combustion state.

9. A control method for an internal combustion engine, comprising the steps of:
    setting a lift amount of an intake valve of an internal combustion engine to a predetermined first set value when starting of the internal combustion engine is initiated,
    changing the lift amount to a second set value that is larger than the first set value before the internal combustion engine is shifted to a perfect combustion state, and
    determining a combustion state of the internal combustion engine, wherein,
    before the lift amount of the intake valve is changed, the lift amount is maintained at the first set value until it is determined that the internal combustion engine has been shifted to an initial combustion state after starting of the internal combustion engine is initiated.

10. A control method for an internal combustion engine, comprising the steps of:
    setting a lift amount of an intake valve of an internal combustion engine to a predetermined first set value when starting of the internal combustion engine is initiated,
    changing the lift amount to a second set value that is larger than the first set value before the internal combustion engine is shifted to a perfect combustion state, and
    detecting a temperature of the internal combustion engine when starting of the internal combustion engine is initiated, wherein,
    when the temperature of the internal combustion engine is equal to or lower than a first predetermined temperature, the lift amount of the intake valve is changed to the second set value that is larger than the first set value before the internal combustion engine is shifted to the perfect combustion state.

11. The control method according to claim 10, further comprising the step of:
    setting the lift amount to a third set value that is larger than the first set value during a period from when starting of the internal combustion engine is initiated until when the internal combustion engine is shifted to the perfect combustion state, when the temperature of the internal combustion engine is equal to or lower than a second predetermined temperature that is higher than the first predetermined temperature.

12. The control method according to claim 11, further comprising the step of:
    setting the lift amount to a fourth set value that is smaller than the second set value during the period from when starting of the internal combustion engine is initiated until when the internal combustion engine is shifted to the perfect combustion state, when the temperature of the internal combustion engine is higher than the second predetermined temperature.

* * * * *

UNITED STATES PATENT AND TRADEMARK OFFICE
CERTIFICATE OF CORRECTION

| | |
|---|---|
| PATENT NO. | : 7,159,556 B2 |
| APPLICATION NO. | : 11/219666 |
| DATED | : January 9, 2007 |
| INVENTOR(S) | : Masatomo Yoshihara |

It is certified that error appears in the above-identified patent and that said Letters Patent is hereby corrected as shown below:

In column 1, line 43, please change the line as follows:
"cold, air is take in a", should read --cold, air is taken in a --

In column 8, line 63, please change the line as follows:
"operates by itself", should read --operate by itself--

In column 11, line 2, please change the line as follows:
"intial combustion state can realized", should read --initial combustion state can be realized--

In column 11, line 30, please change the line as follows:
"is shifted to in the initial", should read --is shifted to the initial--

In column 11, line 31, please change the line as follows:
"is shifted to in the perfect", should read --is shifted to the perfect--

In column 14, line 8, please change the line as follows:
"amount is reduced, an inlet of the intake valve 9 become", should read --amount is reduced, and inlet of the valve 9 becomes--

In column 14, line 12, please change the line as follows:
"cause a large turbulent", should read --cause a large turbulence--

In column 15, line 11, please change the line as follows:
"sponding the perfect", should read --sponding to the perfect--

Signed and Sealed this

Eighteenth Day of September, 2007

JON W. DUDAS
*Director of the United States Patent and Trademark Office*